R. A. PIERCE.
SLIDE RULE.
APPLICATION FILED FEB. 25, 1920.
1,398,914.
Patented Nov. 29, 1921.
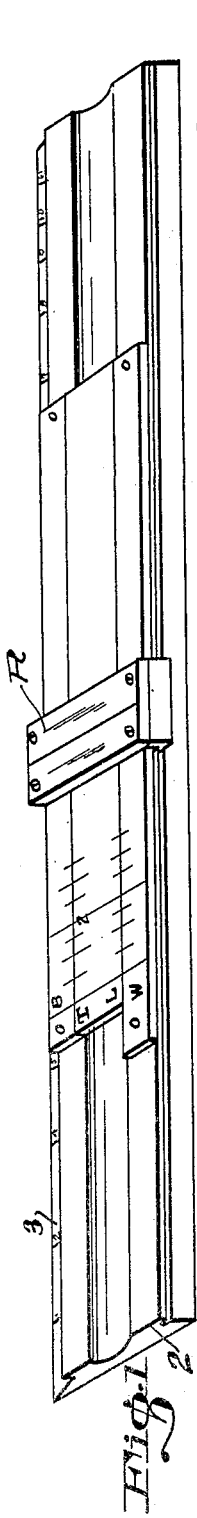
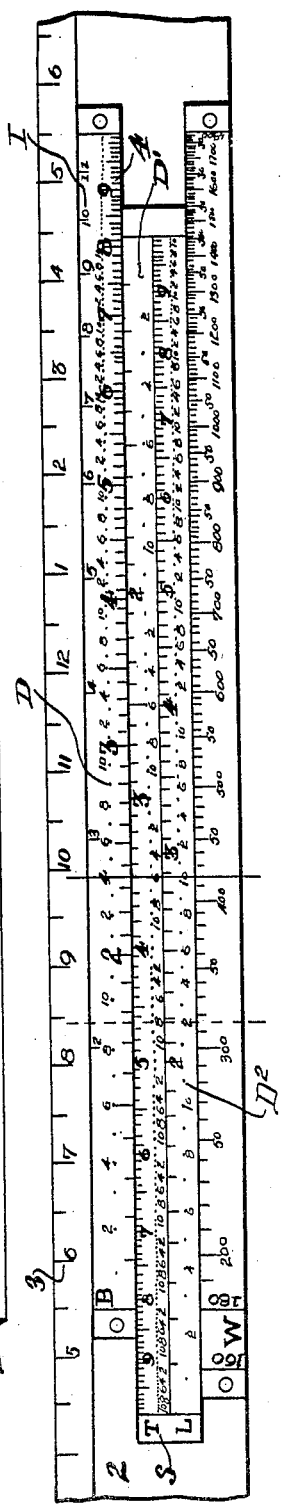
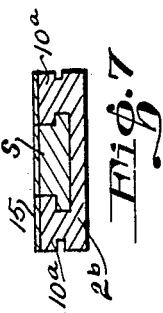
INVENTOR
R. A. Pierce
BY
Hazard & Miller
Att'ys

UNITED STATES PATENT OFFICE.

ROBERT A. PIERCE, OF LOS ANGELES, CALIFORNIA.

SLIDE-RULE.

1,398,914. Specification of Letters Patent. Patented Nov. 29, 1921.

Application filed February 25, 1920. Serial No. 361,331.

*To all whom it may concern:*

Be it known that I, ROBERT A. PIERCE, a citizen of the United States, residing at Los Angeles, in the county of Los Angeles and State of California, have invented new and useful Improvements in Slide-Rules, of which the following is a specification.

This invention relates to calculating slide rules and has for its object to provide a slide rule that is of extremely simple construction and is simple in the organization and graduation of the several scales so as to enable ordinary mechanics to readily ascertain cubic contents or cubic feet of objects such as pieces of stone, and to also readily deduct the weight of a given volume of stone when figuring on stone of given character; one of the scales being subdivided according to the weight per cubic foot of given stone. The invention consists of the construction, the combination and in details and arrangements of the parts, an embodiment of which invention is illustrated in the accompanying drawings and described and claimed herein.

Fig. 1 is a perspective of the improved calculating device.

Fig. 2 is a plan view of the device with the runner omitted, but its positions being shown by transverse full and dotted lines, the mounting of the logarithmic scales being broken away.

Figs. 3, 4, 5, 6 and 7 show transverse sections of various types of construction of the relatively movable elements of the device with the runner omitted.

The rule comprises, for instance, a mounting or base part 2 that is preferably utilized also for ordinary measuring purposes, and to that end is provided on one longitudinal edge with an English scale of feet and inches designated at 3 though any other system of units may be utilized.

On the top face of the rule body 2 and preferably immediately below the scale 3 there is provided a longitudinally disposed logarithmic scale identified hereinafter as the scale B and on which the volume or cubic foot contents of a given object will be ascertained in the use of the rule. This logarithmic scale B has the usual logarithmic divisions 4 along its inner edge, and along its outer edge there is provided a scale I indicating subdivisions of inch value to facilitate the measuring of volume when the involved dimension is less than one foot; in other words the scale I is utilized when setting the rule to secure a result in a problem in which one of the factors is, for instance, eleven inches where the logarithmic scale 4 on the scale B could not be accurately utilized.

A further feature of the scale B is that the usual scale tenth divisions are not subdivided into hundredths but only into tenths. Again, another feature is the provision, on the scale B and preferably between the graduations of the scales I and 4, a row or series of dots D, these dots such as bearing relation to the tenth divisions of the scale 4 and replacing the usual hundredth divisions of the tenths, these dots being so spaced apart from each other as to be readable directly in inches and therefore avoiding the necessity of finding their decimal equivalent so as to enable the user, who may be an ordinary mechanic, to set and read the device in feet and inches and entirely obviate the necessity of reducing the inches in any of the factors of a problem into decimal equivalents.

On the opposite edge of the mounting or rule body 2 there is provided a scale W, that is made up of data including graduated marks, certain of which are numbered for giving the weight of a stone when the runner R of the device has been set in combination with the intermediate slide S. It will be understood that the weight data on the scale W corresponds with the weight per cubic foot of given material and therefore said scale is detachably mounted on member 2, in order that it may be readily detached and replaced by another scale when material having a different weight per cubic foot is to be calculated. In the present instance, this scale W is illustrated as being graduated and numbered so as to figure the weight of stone of any volume, a cubic foot of which weighs approximately 180 pounds.

The slide S is longitudinally slidable between the scale B and the scale W and has formed along its edge immediately adjacent to scale 4 a scale designated T indicating, for instance, measurements of thickness, the logarithmic indices of which read in a direction opposite to that of the scale B (the latter being readable, for instance for measurements of breadth). The scale T is subdivided into the usual logarithmic tenths and these in turn are divided into tenths and, as in scale B, scale T is provided with a row of dots forming a scale D' readable directly in the setting of the device as inches, this dot scale substituting for the hundredths subdivision of the scale T for the same reason as above described with relation to the dot scale B.

On the opposite edge of the slide S or the edge may be adjacent to scale W is provided a scale L, that is formed so as to be readable in measurement of length in a given example, this scale L being divided into the usual logarithmic divisions that are subdivided into tenths, and the hundredth subdivisions being designated by the inch reading line of dots $D^2$.

In the operation of the device to find the cubic feet and the weight of a piece of stone that is 2' 4" x 3' 6" x 2' 2"; first set the runner R on the 2' 4" mark of scale B; then move slide T to bring the 3' 6" mark to runner which is now on 2' 4" mark of scale B; then shift the runner along scale L to the length mark 2' 2" on scale L. The number of cubic feet in the piece of stone is then ascertained by reading on the scale B and the weight is found by reading the registration weight scale W that is immediately adjacent to the guide line that is formed on runner R, the top portion of which latter is preferably formed of glass or suitable transparent material.

To find the cubic feet and weight of a piece of stone or the like 8" x 1' 2" by any length on the scale L; set the runner R on the inch mark of the marginal inch scale I of scale B (since the factor is less than one foot) then move the scale T to 1' 2" under the runner; and for the length move the runner on scale L (as set) to the length factor and the cubic feet will be found on B and the weight on W relative to the sight line of the runner.

Different mechanical embodiments of the invention are illustrated in Figs. 3 to 7 inclusive the materials and the dimensions of the elements varying according to the nature of the service to which the instrument is to be applied.

In Fig. 3 the base $2^a$ is of relatively thin material and may be of metal to which are attached longitudinal guide strips 10 outwardly grooved at 11 to receive the runner not shown and between which is arranged the slide S' that may be of wood. The scale parts 12, 13 and 14 are arranged in a common plane and may be of wood, brass or celluloid.

In Fig. 4 there is shown a form of the device made entirely of metal, and in Fig. 5 the base member $2^a$ may be of steel to which is applied longitudinal guide members 10' that may be made of celluloid or other substantial hard material the faces of which may be provided with suitable graduation marks as shown in Fig. 2.

The devices in Figs. 3, 4 and 5 are adapted for general shop and more or less heavy service, while in Figs. 6 and 7 embodiments of the invention as adapted for office, clerical and sales purposes are shown. The scale is of course adapted for other calculating purposes as in engineering work.

In Fig. 6 the several parts are comparatively thin and light and may be made of comparatively rigid material such as brass or zinc. In Fig. 7 the side guide portions $10^a$ are shown as integrally formed with the mounting or body member $2^b$, which may be of wood, and the scales may be applied thereto and may consist of paper strips 15.

Various changes may be made without departing from the spirit of the invention as claimed.

What is claimed is:

1. A slide rule having relatively fixed spaced scales for respective cubical foot and weight factors in an example, the cubic foot scale having the usual logarithmic graduations and having calibrations readable in inch terms, a runner arranged for sliding movement above said fixed scales, a slide arranged between said fixed scales and having two logarithmic scales one for the thickness dimension and one for length dimension, whereby when the runner and said slide have been coördinately arranged on breadth, length and thickness graduations of a given character the cubic content and the weight of a given material for the cubic content can be ascertained on the weight scale.

2. A slide rule having relatively fixed spaced scales for respective cubical foot and weight factors in an example, the cubic foot scale having the usual logarithmic graduations and having calibrations readable in inch terms, a runner arranged for sliding movement above said fixed scales, a slide arranged between said fixed scales and having two logarithmic scales one for the thickness dimension and one for length dimension, whereby when the runner and said slide have been coördinately arranged on breadth, length and thickness graduations of a given character the cubic content and the weight of a given material for the cubic content can be ascertained on the weight scale; the first named logarithmic scale having logarithmic divisions along one edge readable in inch terms to facilitate setting of the device when the breadth factor is less than one foot.

3. A logarithmic calculating device comprising a mounting and provided with a fixed logarithmic scale for breadth dimension and a fixed logarithmic scale graduated to give the weight of a given material with respect to its volume; a slide arranged between said logarithmic scales and having two logarithmic scales one of which is set reverse to the other, said slide being movable between the breadth and the weight scales; and a runner movable to various positions with respect to the scales; the breadth, the thickness and the length scales having graduation marks readable in inch terms to facilitate the setting of the movable members without ascertaining decimal equivalents of inches.

In testimony whereof I have signed my name to this specification.

R. A. PIERCE.